(12) United States Patent
Stahl et al.

(10) Patent No.: US 9,711,818 B2
(45) Date of Patent: Jul. 18, 2017

(54) CHARGE TRANSFER MEDIATOR BASED SYSTEMS FOR ELECTROCATALYTIC OXYGEN REDUCTION

(71) Applicant: Wisconsin Alumni Research Foundation, Madison, WI (US)

(72) Inventors: Shannon S. Stahl, Madison, WI (US); James B. Gerken, Madison, WI (US); Colin W. Anson, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 124 days.

(21) Appl. No.: 14/657,531

(22) Filed: Mar. 13, 2015

(65) Prior Publication Data

US 2015/0263371 A1 Sep. 17, 2015

Related U.S. Application Data

(60) Provisional application No. 61/953,342, filed on Mar. 14, 2014.

(51) Int. Cl.
| | |
|---|---|
| *H01M 8/18* | (2006.01) |
| *H01M 8/20* | (2006.01) |
| *C25B 1/00* | (2006.01) |
| *C25B 9/08* | (2006.01) |
| *H01M 4/90* | (2006.01) |

(52) U.S. Cl.
CPC ............ *H01M 8/188* (2013.01); *C25B 1/00* (2013.01); *C25B 9/08* (2013.01); *H01M 4/9008* (2013.01); *H01M 4/9041* (2013.01); *H01M 8/20* (2013.01); *Y02E 60/528* (2013.01)

(58) Field of Classification Search
None
See application file for complete search history.

(56) References Cited

U.S. PATENT DOCUMENTS

| | | | |
|---|---|---|---|
| 6,187,170 B1 * | 2/2001 | Hampp | C25B 3/02 204/242 |
| 8,492,048 B2 | 7/2013 | Knuckey et al. | |
| 2008/0274385 A1 | 11/2008 | Creeth | |
| 2009/0278556 A1 * | 11/2009 | Man | G01N 27/4146 324/693 |
| 2010/0112388 A1 | 5/2010 | Knuckey et al. | |
| 2010/0297522 A1 | 11/2010 | Creeth et al. | |

FOREIGN PATENT DOCUMENTS

| | | |
|---|---|---|
| WO | 2006/097438 | 9/2006 |
| WO | 2008/009993 | 1/2008 |
| WO | 2012/085542 | 6/2012 |

* cited by examiner

*Primary Examiner* — Patrick Ryan
*Assistant Examiner* — Wyatt McConnell
(74) *Attorney, Agent, or Firm* — Boyle Fredrickson, S.C.

(57) ABSTRACT

Disclosed are systems for the electrocatalytic reduction of oxygen, having redox mediator/redox catalyst pairs and an electrolyte solution in contact with an electrode. The redox mediator is included in the electrolyte solution, and the redox catalyst may be included in the electrolyte solution, or alternatively, may be in contact with the electrolyte solution. In one form a cobalt redox catalyst is used with a quinone redox mediator. In another form a nitrogen oxide redox catalyst is used with a nitroxyl type redox mediator. The systems can be used in electrochemical cells wherein neither the anode nor the cathode comprise an expensive metal such as platinum.

21 Claims, 10 Drawing Sheets

CHARGE TRANSFER MEDIATOR BASED SYSTEMS FOR ELECTROCATALYTIC OXYGEN REDUCTION

CROSS-REFERENCE TO RELATED APPLICATIONS

This application claims the benefit of U.S. provisional application 61/953,342 filed Mar. 14, 2014, which is incorporated by reference herein in its entirety.

STATEMENT REGARDING FEDERALLY SPONSORED RESEARCH/DEVELOPMENT

This invention was made with government support under DE-AC05-76RL01830 awarded by the US Department of Energy. The government has certain rights in the invention.

BACKGROUND OF THE INVENTION

The present invention relates to the oxygen reduction reaction that may occur at the cathode of an electrochemical cell, such as a fuel cell or an electrosynthetic cell. More particularly, it relates to improving the efficiency of such reactions by using a charge transfer mediator that is capable of transferring electrons and protons, in combination with a redox catalyst.

An electrochemical cell is a device comprising two half-cells, each of which comprises an electrode and an electrolyte. In operation, chemical species in one half-cell lose electrons (oxidation) to the electrode (the anode), while chemical species in the other half-cell gain electrons (reduction) from the electrode (the cathode). Each electrode is attached to a structure suitable for transmitting electricity through an external circuit. Furthermore, in order to maintain a compensatory flow of charge within the cell, certain ions may be allowed to move freely between the two half-cells (i.e., the two half-cells are in "ionic communication" with each other).

In one type of electrochemical cell, electrical energy is generated by the spontaneous reaction occurring at each half-cell (together, a redox reaction). Such cells are sometimes called voltaic or galvanic cells. In fuel cells, which are a specific type of galvanic cell, a fuel (e.g. hydrogen, methanol, methane, or another material that can be readily oxidized) is oxidized at the anode, and oxygen or another oxidizing agent is reduced at the cathode, generating a flow of electricity that can be used commercially in a variety of applications, such as for generating primary or backup electrical power, or to supply the electricity needed to run an electric vehicle, such as a forklift or an automobile.

In another type of electrochemical cell, known as an electrosynthetic cell, a desired chemical product is synthesized at the anode or cathode. Such cells may, like voltaic cells, generate electricity as a byproduct of the desired synthesis, or alternatively, they may require that electrical current is continuously applied to drive a non-spontaneous redox reaction. As an example of an electrosynthetic cell, methanol may be oxidized at the anode to produce formaldehyde, and oxygen or another oxidizing agent may be reduced at the cathode. Note that in operation, the same oxygen reduction reaction may occur at the cathode in either a fuel cell or an electrosynthetic cell.

Platinum cathodes are widely used to facilitate oxygen reduction in cathodic half-cells. Although quite efficient, such cathodes are very expensive, due to platinum's relative scarcity. To render such cells more practical, it is desirable to use lower cost cathodes, without materially compromising efficiency, useful life, or other desired characteristics.

To address these concerns, there have been a variety of efforts to develop improved cathodic half-cells for oxygen reduction. Some have attempted to surface coat base cathode materials, thereby reducing the amount of the most expensive metals that need to be used.

In WO 2012/085542, it was proposed that a polyoxometalate redox catalyst could be used in conjunction with a vanadyl mediator to facilitate electrocatalytic oxygen reduction using a less expensive cathode. While this had some benefits, further improvements were still desired.

There remains a need for improved half-cells for more efficient electrocatalytic oxygen reduction, particularly with respect to avoiding the need for expensive metals to efficiently catalyze the oxygen reduction reaction that may occur at the cathode of an electrochemical cell.

SUMMARY OF THE INVENTION

In a first aspect, the invention encompasses a system that includes an electrode and an electrolyte solution in contact with the electrode. The electrolyte solution includes a redox mediator capable of transferring protons and electrons by acid/base and/or oxidation/reduction reactions. The system further includes a redox catalyst. The redox catalyst may be included in the electrolyte solution, or alternatively, may be in contact with the electrolyte solution.

In some embodiments, the reduced form of the redox mediator is an unsubstituted dihydroxybenzene, a substituted dihydroxybenzene, or a substituted hydroxylamine. Optionally, the substituted or unsubstituted dihydroxybenzene may be a 1,2-dihydroxybenzene (a catechol) or a 1,4-dihydroxybenzene (a hydroquinone). In some embodiments, the reduced form of the redox mediator is 1,4-dihydroxybenzene (hydroquinone).

In embodiments where the reduced form of the redox mediator is a substituted dihydroxybenzene, one or more hydrogen atoms in the dihydroxybenzene is substituted with a substituent group. Exemplary substituent groups that could be independently substituted for each hydrogen atom include an alkyl with less than ten carbons, an aryl, fused aryl (e.g., naphthoquinone or anthraquinone and derivatives thereof), a heterocycle, an alkenyl, an alkynyl, a cycloalkyl, an amine, a protonated amine, a quaternary amine, sulfate, a sulfonate, sulfonic acid, phosphate, a phosphonate, a phosphinate, a ketone, an aldehyde, an oxime, a hydrazone, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, phosphine oxide, a quaternary phosphonium, a quaternary borate, a siloxane, or a nitro.

In embodiments where the reduced form of the redox mediator is a substituted hydroxylamine, one or more nitrogen-bound hydrogen atoms in hydroxylamine is substituted with a substituent group. Exemplary substituent groups that could be independently substituted for each hydrogen include an alkyl with less than ten carbons, an aryl, a cycloalkyl, and a bicycloalkyl. In some embodiments, the same substituent group may substitute for two different hydrogen atoms, thus forming a heterocycle. In some embodiments, at least one form of the redox mediator may be a stable radical.

In some embodiments where the reduced form of the redox mediator is a substituted hydroxylamine, one or more of the substituent groups may further include an alkyl with less than ten carbons, an aryl, a heterocycle, an alkenyl, an alkynyl, a cycloalkyl, an amine, a protonated amine, a quaternary amine, sulfate, a sulfonate, sulfonic acid, phosphate, a phosphonate, a phosphinate, a ketone, an aldehyde, an oxime, a hydrazone, a nitrone, an ether, an ester, a halide, a nitrile, carboxylate, an amide, a thioether, a fluoroalkyl, a perfluoroalkyl, a pentafluorosulfanyl, a sulfonamide, a sulfonic ester, an imide, carbonate, a carbamate, a urea, a sulfonylurea, an azide, a sulfone, a sulfoxide, an amine oxide, a phosphine oxide, a quaternary phosphonium, a quaternary borate, a siloxane, a nitro, and combinations of two or more thereof on the same or on different positions on the substituent.

Exemplary redox mediators where the reduced form is a substituted hydroxylamine include, without limitation, (2,2,6,6-tetramethylpiperidin-1-yl)oxy (TEMPO), 4-acetamidoTEMPO, or 9-azabicyclo[3.3.1]nonane N-oxyl (ABNO).

In some embodiments, the redox catalyst includes one or more metals. In some such embodiments, the one or more metals may include tungsten (W), iron (Fe), cobalt (Co), manganese (Mn), molybdenum (Mo), vanadium (V), ruthenium (Ru), copper (Cu) or silver (Ag). In some such embodiments, the redox catalyst is an organometallic complex, such as a metal macrocycle or chelate complex. A non-limiting example of a metal complex that could be used is M(salophen), such as Co(salophen).

In some embodiments, the catalyst is in the form of an insoluble material that is in contact with the electrolyte solution. This catalyst need not be on the electrode.

In some embodiments, the redox catalyst is a nitrogen oxide ($NO_x$). Non-limiting examples include NO (reduced form), $NO_2$ (oxidized form), and mixtures thereof.

In some embodiments, the electrolyte solution further comprises a pH buffer that is capable of accepting protons from and/or giving protons to the redox mediator. Non-limiting examples include an acetic acid/acetate buffer system.

In some embodiments, the electrolyte solution further comprises oxygen, which is the final electron acceptor of the oxygen reduction reaction that is facilitated by the system.

In a second aspect, the invention encompasses an electrochemical cell that includes the system as described above, where the system is in ionic communication with an anodic half cell. In some embodiments, the electrochemical cell is a fuel cell or an electrosynthetic cell. In some embodiments, the electrochemical cell is a flow battery, wherein the electrolyte solution is stored outside of the cell, and can be fed into the cell in order to generate electricity. In some embodiments, the electrochemical cell combines aspects of a fuel cell or an electrosynthetic cell and a flow battery, wherein the electrolyte solution is circulated through a reactor to regenerate spent mediator, and is eventually returned to the electrochemical cell.

In a third aspect, the invention encompasses a method of producing electricity. The method includes the steps of contacting the anodic half cell of the electrochemical cell as described above with a fuel, and contacting the system as described above with oxygen, whereby the fuel is oxidized, oxygen is reduced, and electricity is produced.

In a fourth aspect, the invention encompasses a method of producing a desired chemical product. The method includes the steps of contacting the anodic half cell of the electrochemical cell as described above with a precursor of the desired chemical product, and contacting the system as described above with oxygen, whereby the precursor is oxidized to the desired product, and the oxygen is reduced.

In an exemplary electrochemical cell, there is an anode, a cathode, a region suitable to receive a fuel (in a fuel cell) or precursor chemical (in a electrosynthetic cell), a region adjacent the cathode suitable for receiving an oxidant (such as oxygen), a structure suitable for transmitting electricity, and a catholyte solution in fluid communication with the cathode. See generally WO 2012/085542.

As an example, the anode may be platinum or palladium based materials, the cathode may be a graphite material such as porous reticulated vitreous carbon, the fuel may be hydrogen gas or methanol, the precursor chemical may be methanol (to produce, for example, formaldehyde) or ethylene (to produce, for example, vinyl acetate), oxygen may be sourced from oxygen gas or the oxygen component of air, the cathode and anode may be linked by wires or other means to transmit the generated electricity to power a battery or for other applications, and there may be a cation selective polymer electrolyte membrane separating the anode and cathode areas (e.g., one made from Nafion).

As an example, the cathode area in the cell described above can be filled with a solution that is in contact with the cathode and a cation selective membrane. This solution may contain 0.1 to 1 M of an electrolyte such as $LiPF_6$, 0.01 to 0.1 M of a mediator such as TEMPO, 0.01 to 0.1 M of an oxidizing catalyst such as $NaNO_2$, dissolved in a 9:1 mixture of acetonitrile and acetic acid. An oxidant such as oxygen is mixed into the catholyte solution whilst hydrogen or some other fuel or precursor chemical is introduced to the anode area of the cell to effect its operation.

As another example, the cathode area in the cell described above is filled with a solution that is in contact with the cathode and cation selective membrane. This solution may contain from 0.1 to 1.0 M of an electrolyte such as $NBu_4PF_6$, 0.01 to 0.1 M of a redox mediator such as hydroquinone, 0.001 to 0.1 M of a redox catalyst such as Co(salophen), dissolved in DMF with 0.1 to 1.0 M acetic acid. An oxidant such as oxygen is mixed into the catholyte solution while hydrogen or other fuel is introduced into the anode area of the cell to effect its operation.

In accordance with the present invention, the catholyte solution may include a redox mediator suitable to be at least partially reduced at the cathode during operation of the cell, and at least partially re-oxidized during such operation, directly or indirectly, by reaction with a fuel cell oxidant after such reduction at the cathode. This redox mediator is most preferably a compound capable of transporting protons and electrons through the solution by acid/base and/or oxidation/reduction reactions.

One preferred class of such redox mediators are quinones, used with a redox catalyst (e.g. cobalt or iron-containing catalysts). For example, a reduced form of the redox mediator could be a hydroquinone, and an oxidized form could be benzoquinone. See FIG. 1.

Optionally, the quinone can be substituted at various locations around the quinone ring. For example, substituent groups may be selected from the group consisting of alkyl with less than ten carbons, aryl, fused aryl (e.g., naphthoquinone or anthraquinone and derivatives thereof), alkenyl, alkynyl, cycloalkyl, amine, protonated amine, quaternary amine, sulfate, sulfonate, sulfonic acid, phosphate, phosphonate, a phosphinate, a ketone, an aldehyde, an oxime, a hydrazone, a nitrone, ether, ester, halide, nitrile, carboxylate, amide, thioether, fluoroalkyl, perfluoroalkyl, pentafluorosulfanyl, sulfonamide, sulfonic ester, imide, carbonate, carbamate, urea, sulfonylurea, azide, sulfone, sulfoxide, amine oxide, phosphine oxide, quaternary phosphonium, quaternary borate, siloxane, nitro, and combinations of two or more thereof on the same or on different positions on the ring. One example would be a heterocycle.

Another class of preferred redox mediators are compounds capable of generating nitroxyl type structures. For example, a reduced form of the mediator may be a hydroxylamine that includes one or more substituent functional groups thereon at the nitrogen besides the oxygen. See, e.g., FIG. 3. These could be coupled with a redox catalyst, such as a catalyst based on nitrogen oxide ($NO_x$), such as such material supplied by $HNO_3$ and $NaNO_2$.

Apart from the oxygen, the nitrogen may be linked to various groups selected from the group consisting of alkyl with less than ten carbons, aryl, heterocyclic, cycloalkyl, bicycloalkyl and combinations thereof, or one or more substituent group may comprise alkyl with less than ten carbons, aryl, alkenyl, alkynyl, cycloalkyl, amine, protonated amine, quaternary amine, sulfate, sulfonate, sulfonic acid, phosphate, phosphonate, phosphinate, ketone, aldehyde, oxime, hydrazone, nitrone, ether, ester, halide, nitrile, carboxylate, amide, thioether, fluoroalkyl, perfluoroalkyl, pentafluorosulfanyl, sulfonamide, sulfonic ester, imide, carbonate, carbamate, urea, sulfonylurea, azide, sulfone, sulfoxide, amine oxide, phosphine oxide, quaternary phosphonium, quaternary borate, siloxane, nitro, and combinations of two or more thereof on the same or on different positions on the substituent.

In sum, we have discovered that it is desirable for a half-cell used for electrocatalytic oxygen reduction to include a redox mediator/redox catalyst pair (along with a cathode and electrolyte). This permits much more expensive cathodes to be avoided, without significant undesired performance problems being introduced. A catholyte solution may comprise a pH buffer that accepts and gives protons from and to the redox mediator. Quinones paired with cobalt or iron-containing redox catalysts are one class of particularly preferred materials, as are nitroxyl-type materials paired with nitric oxide type redox catalysts.

The above and still other advantages of the present invention will be apparent from the description that follows. For example, altering substituents on the mediator can tailor the mediator performance for particular needs.

It should be appreciated that the following description is merely of preferred embodiments of our invention. The claims should therefore be looked to in order to understand the full claimed scope of the invention.

DETAILED DESCRIPTION OF THE PREFERRED EMBODIMENTS

I. In General

This invention is not limited to the particular methodology, protocols, materials, and reagents described, as these may vary. Furthermore, the terminology used herein is for the purpose of describing particular embodiments only, and is not intended to limit the scope of the present invention which will be limited only by the pending claims.

As used herein and in the appended claims, the singular forms "a", "an", and "the" include plural reference unless the context clearly dictates otherwise. As well, the terms "a" (or "an"), "one or more" and "at least one" can be used interchangeably herein. The terms "comprising", "including", and "having" can be used interchangeably.

Unless defined otherwise, all technical and scientific terms used herein have the same meanings as commonly understood by one of ordinary skill in the art. Although any methods and materials similar or equivalent to those described herein can be used in the practice or testing of the present invention, the methods and materials of several embodiments now described. All publications and patents specifically mentioned herein are incorporated by reference in their entirety for all purposes.

II. The Invention

This disclosure is based on the inventors' discovery that a redox catalyst can be paired with a redox mediator to facilitate the electrocatalytic reduction of oxygen in a cathodic half-cell. Accordingly, the invention encompasses systems comprising an electrode and an electrolyte in contact with the electrode, wherein the electrolyte includes both a redox catalyst and a redox mediator, or a redox mediator with a catalyst that is in contact with the electrolyte. Both the redox catalyst and the redox mediator, which have been described previously, can occur in oxidized, reduced, or intermediate forms (i.e., various "redox forms"). Accordingly, when a redox catalyst or redox mediator is identified in a particular form herein, such identification also includes the corresponding alternative redox forms, each of which would be readily apparent to one skilled in the art.

Because in the disclosed systems, the electrode itself does not necessarily act as a catalyst, the type of electrode used is not limited, and may comprise any electrode material that is typically used in the art.

The following examples are offered for illustrative purposes only, and are not intended to limit the scope of the present invention in any way. Indeed, various modifications of the disclosed method in addition to those shown and described herein will become apparent to those skilled in the art from the foregoing description and the following examples and fall within the scope of the appended claims.

EXAMPLE 1

Benzoquinone/Hydroquinone as a Redox Mediator with a Soluble Catalyst

Figure 1:
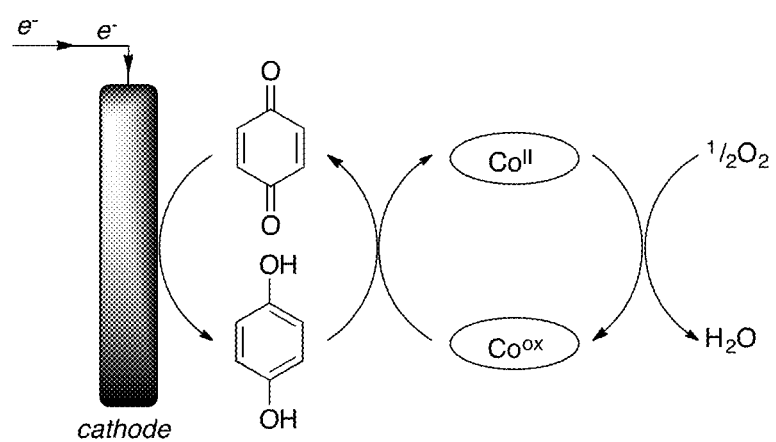
FIG. 1 depicts the electrocatalytic reduction of oxygen facilitated by a system of the present invention, where there is a cobalt redox catalyst and a hydroquinone/benzoquinone redox mediator.
Figure 2:
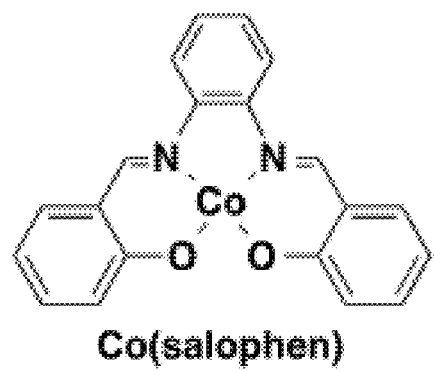
FIG. 2 depicts the structure of a preferred cobalt redox catalyst useful with the FIG. 1 system.

FIG. 1 depicts use of a quinone in connection with our invention. We paired this with a cobalt based redox catalyst, the compound Co(salophen) depicted in FIG. 2.

In one example, we focused on the solvent combination of N,N-dimethylformamide (DMF) with 0.15-0.2 M AcOH. Cyclic voltammetry was used to probe the feasibility of electrocatalytic $O_2$ reduction using this system. Initial control tests with benzoquinone under $N_2$ and $O_2$ or catalyst under $N_2$ and $O_2$ were also conducted to determine the behavior of each component on its own.

The behavior of benzoquinone under $O_2$ and $N_2$ was nearly identical with the reduction of benzoquinone to hydroquinone observed at −0.80 V (all potentials vs. $Fc/Fc^+$) and the oxidation of hydroquinone to benzoquinone observed at −0.19 V. The onset of the wave due to direct reduction of $O_2$ by cobalt and acid was not observed until approximately −0.90 V, 460 mV more reducing than the $Co^{III}/Co^{II}$ potential at −0.44 V. Examining the fully constituted system under an atmosphere of $N_2$ versus $O_2$ indicated an increase in current at potentials corresponding to the benzoquinone reduction peak. In any event, our results indicated that effective catalysis was occurring when using the cobalt redox catalyst and the benzoquinone mediator.

To gain further insight into the electrocatalytic $O_2$ reduction facilitated by the combination of hydroquinone and Co(salophen), bulk electrolysis studies were conducted at −0.81 V vs. $Fc/Fc^+$. If the formation of hydroquinone increased the activity of the system for oxygen reduction, we would expect to see a higher steady-state current for the case with the cobalt catalyst plus hydroquinone under $O_2$ than for the case solely with Co under $O_2$ (and we did).

Bulk electrolysis studies were performed in the presence of 0.2 M AcOH. With only Co(salophen) (1 mM) and $O_2$ approximately 62.1 C of charge were passed over 4 h. When the system was fully constituted (1 mM Co(salophen) and 20 mM 1,4-hydroquinone) under $O_2$, 162.7 C of charge were passed, which corresponds to approximately 13 turnovers of the Co(salophen) for the desired pathway.

In a second example, we focused on methanol as the solvent with 0.2 M acetic acid. Initial cyclic voltammetry studies suggested that methanol with no added acid is a promising solvent due to an increase in current when Co(salophen) and benzoquinone are present together under $O_2$ than under $N_2$.

Again, bulk electrolysis studies were conducted to investigate the feasibility of Co(salophen) paired with hydroquinone as catalysts. With 1 mM Co(salophen) and $O_2$ in the AcOH/methanol solution, 118.8 C of charge was passed over 4 h. When the system was fully constituted (1 mM Co(salophen), 20 mM 1,4-hydroquinone) under $O_2$, 158.0 C of charge were passed, corresponding to approximately 5.1 turnovers of the Co(salophen) catalyst for the desired pathway.

We interpret these results as a proof-of-concept example that quinone mediators paired with cobalt or iron oxidizers can be utilized to more effectively achieve increased currents for the electrocatalytic oxidation/reduction reactions over systems lacking a mediator. Higher sustained currents indicating catalytic turnover were observed in bulk electrolysis experiments.

EXAMPLE 2

Benzoquinone/Hydroquinone as a Redox Mediator with a Heterogeneous Catalyst

Figure 4:
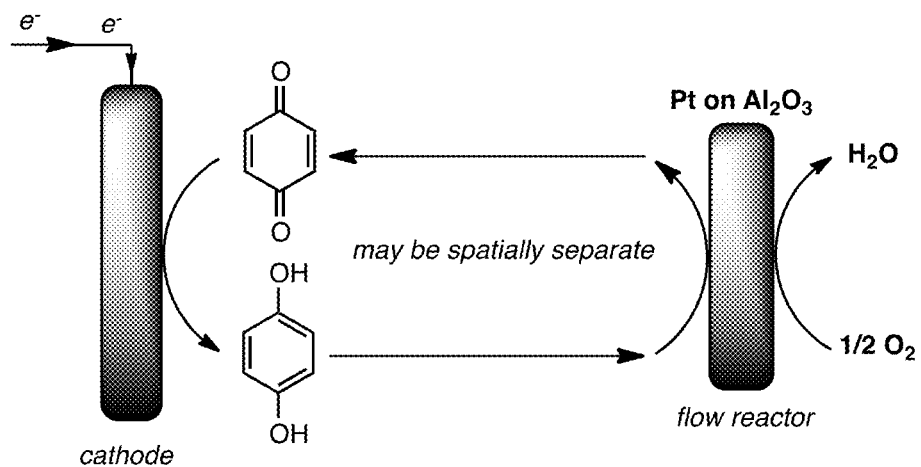
FIG. 4 depicts the electrocatalytic reduction of oxygen facilitated by a system of the present invention, where there is a catalyst that is not dissolved in the electrolyte solution containing the hydroquinone/benzoquinone redox mediator.

We next tested a system where heterogeneous platinum supported on aluminum oxide pellets was the oxidizer and hydroquinone was subject to oxidation and reduction (see FIG. 4). Cyclic voltammetry (CV) measurements were performed at a glassy carbon electrode that was polished with alumina before each experiment. An Ag/AgCl reference electrode and Pt wire counter-electrode were also used. All potentials are reported relative to NHE.

Figure 5:
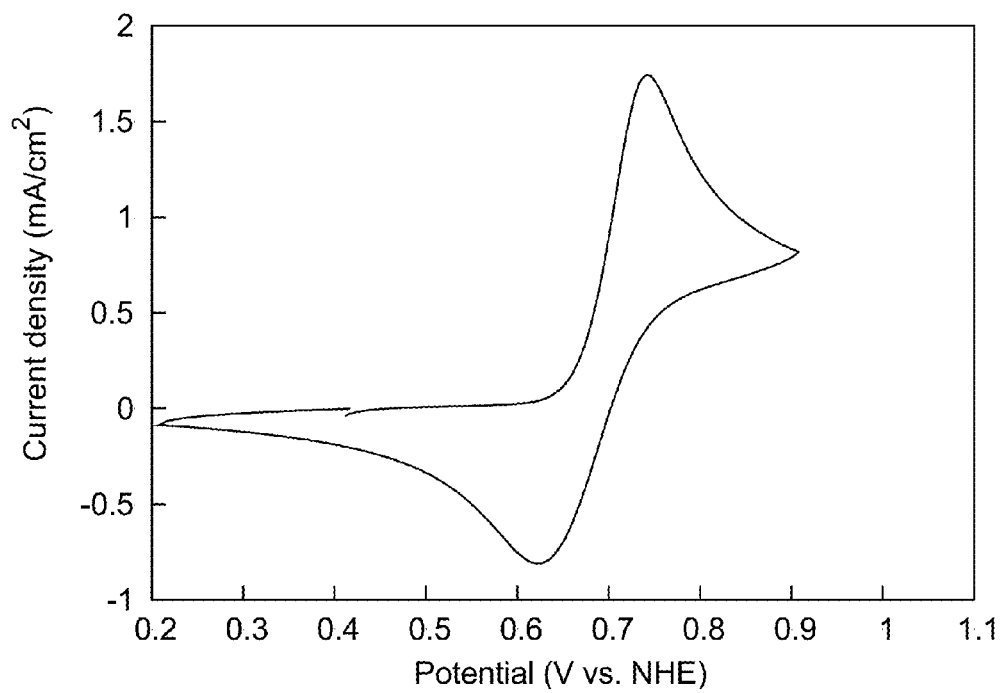
FIG. 5 depicts the cyclic voltammogram obtained at 10 mV/s of 10 mM hydroquinone in aqueous 1 M $H_2SO_4$.

In one example we used a glassy carbon electrode in 10 mM hydroquinone in water, with 1 M $H_2SO_4$ supporting electrolyte. Oxidation and reduction peaks corresponding to formation and consumption of benzoquinone were observed with an $E_{1/2}$ of 682 mV (see FIG. 5).

Figure 6:
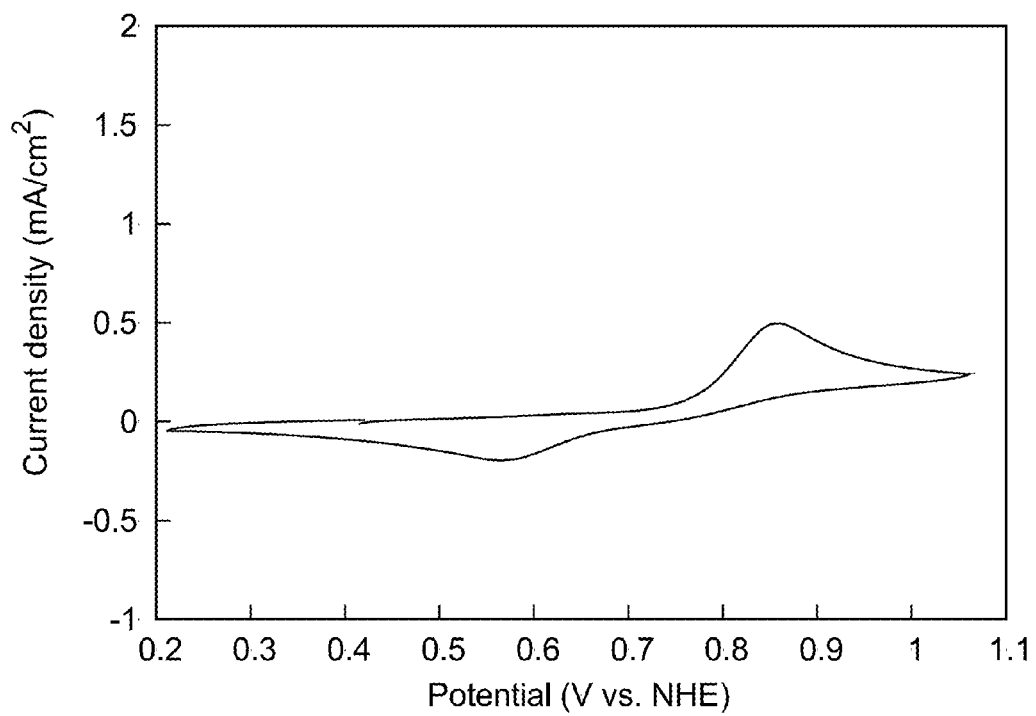
FIG. 6 depicts the cyclic voltammogram obtained at 10 mV/s of 5 mM 2',5'-dihydroxyacetophenone in a 1:1 mixture of acetic acid and aqueous 1 M $H_2SO_4$.

In another example, we tried 10 mM 2',5'-dihydroxyacetophenone in water, with 1 M $H_2SO_4$ supporting electrolyte. It was poorly soluble, but oxidation and reduction peaks were observed with an $E_{1/2}$ of 777 mV. This mediator was more soluble in a 1:1 mixture of 1 M aqueous $H_2SO_4$:acetic acid. In that medium, oxidation and reduction peaks were observed with an $E_{1/2}$ of 712 mV (see FIG. 6).

Figure 9:
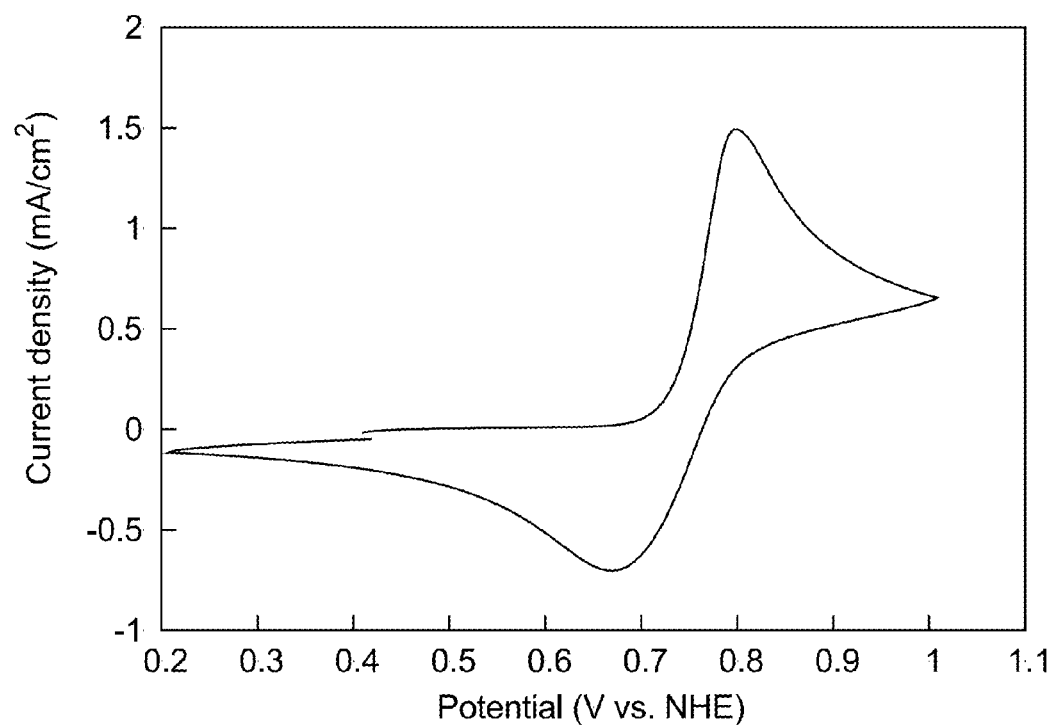
FIG. 9 depicts the cyclic voltammogram obtained at 10 mV/s of 10 mM of the potassium salt of hydroquinonesulfonic acid in aqueous 1 M $H_2SO_4$.

In another example, we tried 10 mM of the potassium salt of hydroquinonesulfonic acid in water, with 1 M $H_2SO_4$ supporting electrolyte. Oxidation and reduction peaks corresponding to formation and consumption of the corresponding quinone were observed with an $E_{1/2}$ of 733 mV (see FIG. 9).

As a further proof of principle electrolysis experiments were performed in a glass cell with a frit dividing the working and counter electrode compartments. A pump circulated the contents of the working electrode compartment through a reactor containing Pt catalyst dispersed on alumina pellets. Air was made to flow through the pellets in countercurrent to the flowing electrolyte solution. After reacting over the catalyst, the electrolyte solution was returned to the working electrode compartment. The working electrode consisted of a block of reticulated vitreous carbon (RVC), with carbon rods as the counter electrode and an Ag/AgCl reference electrode. The electrolyte solution consisted of 1 M $H_2SO_4$ in water.

Figure 7:
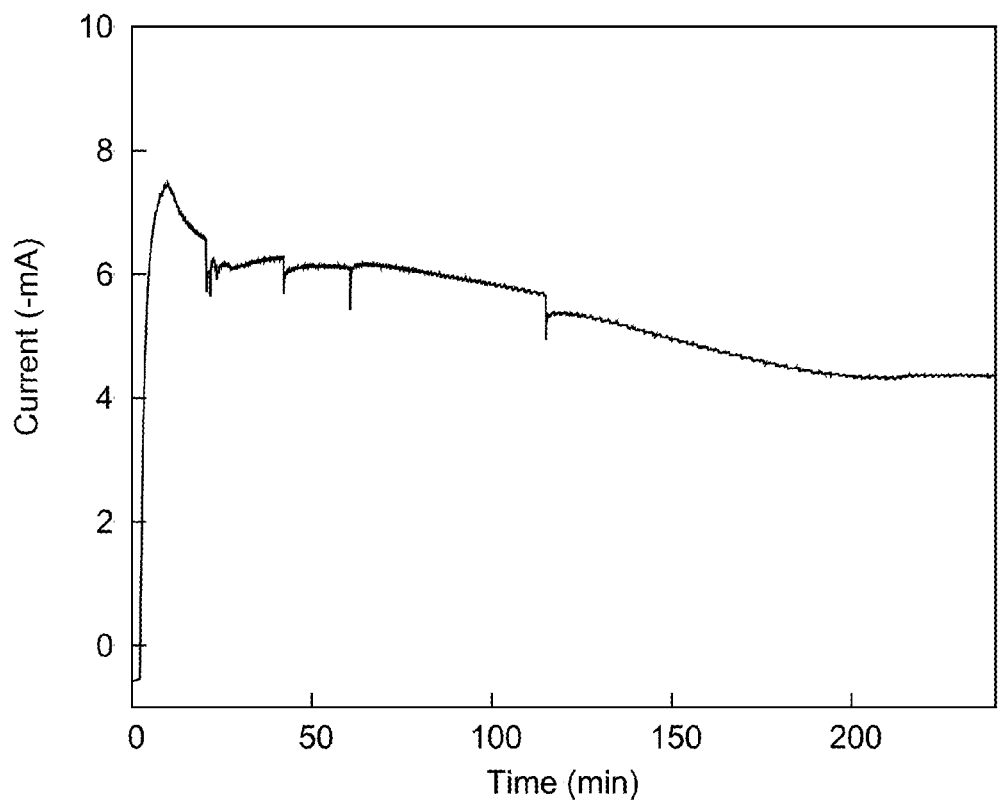
FIG. 7 depicts the current versus time observed at 608 mV vs. NHE of 100 mM hydroquinone in aqueous 1 M $H_2SO_4$ that is circulated over an aerated catalyst.

Constant-potential electrolysis of 0.1 M hydroquinone in 1 M aqueous $H_2SO_4$ was tried in this system at a potential of 608 mV. Because the system is initially loaded with hydroquinone, no reduction current is observed. After two minutes of electrolysis, the pump is turned on and hydroquinone is oxidized to benzoquinone by the catalyst. The current increases as the concentration of benzoquinone in the solution rises. After reaching steady state, the electrolysis was continued for a total time of four hours during which the system continued to display current indicating $O_2$ reduction (see FIG. 7).

Figure 10:
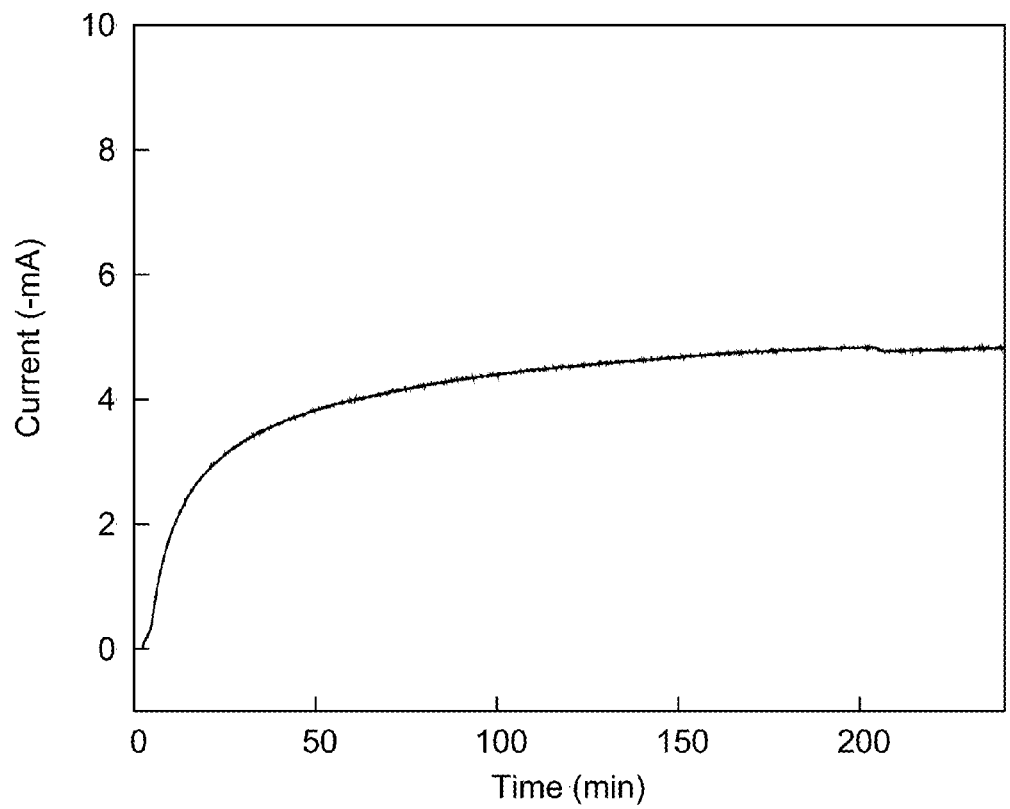
FIG. 10 depicts the current versus time observed at 658 mV vs. NHE of 100 mM of the potassium salt of hydroquinonesulfonic acid in aqueous 1 M $H_2SO_4$ that is circulated over an aerated catalyst.

Constant-potential electrolysis of 0.1 M of the potassium salt of hydroquinonesulfonic acid in 1 M aqueous $H_2SO_4$ was also tried in this system at a potential of 658 mV. Because the system is initially loaded with the hydroquinone form of the mediator, no reduction current is observed. After two minutes of electrolysis, the pump is turned on and the hydroquinone is oxidized to the corresponding benzoquinone by the catalyst. The current increases as the concentration of the benzoquinone form of the mediator in the solution rises. After reaching steady state, the electrolysis was continued for a total time of four hours during which the system continued to display current indicating $O_2$ reduction (see FIG. 10).

Platinum is well known as a catalyst for $O_2$ reduction in fuel cells, wherein it is typically applied to the electrode itself. This example shows an alternative configuration that may prove to be advantageous due to enhanced mass transport of oxygen to the catalyst, which is not constrained to be in a planar configuration on the electrode. The operating potential of the cell is determined by the reduction potential of the mediator, with different mediators having different $E_{1/2}$ values. This example also demonstrates that a redox mediator can enable the utilization of catalysts that are dispersed on supports that do not conduct electricity (e.g., $Al_2O_3$). This is advantageous, since the performance of many catalysts is affected by the nature of their support material and selection of an optimal combination of catalyst, support, and mediator will minimize the need for precious metals.

EXAMPLE 3

Nitroxyl as a Redox Mediator

Figure 3:
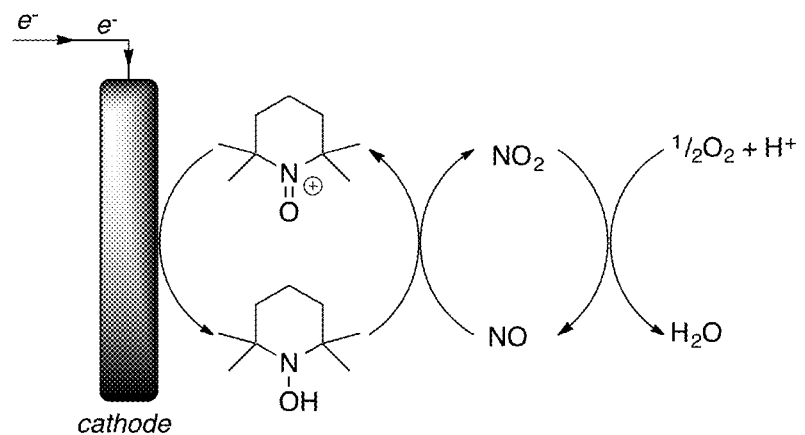
FIG. 3 depicts the electrocatalytic reduction of oxygen facilitated by a system of the present invention, where there is a nitrogen oxide redox catalyst and a nitroxyl-type redox mediator.

We next tested a nitroxyl system where nitrogen oxide was the oxidizer and a nitroxyl was subject to oxidation and reduction (see FIG. 3). Cyclic voltammetry (CV) measurements were performed at a glassy carbon electrode that was polished with alumina before each experiment. An $Ag/Ag^+$ reference electrode and Pt wire counter-electrode were also used. At the end of each experiment, ferrocene was added to the solution and a CV scan was taken to determine the ferrocene/ferricinium potential relative to the reference electrode. All potentials were reported relative to ferrocene.

We then tested the nitroxyl compound $(CH_2)_3(CMe_2)_2$NO, a/k/a "TEMPO" (see FIG. 3), as the mediator.

CV measurements of TEMPO in $CH_3CN$ showed a reversible nitroxyl/oxoammonium process ($E_{1/2}$=235 mV). The variation in peak currents with scan rate support the conclusion that oxidation and reduction take place on species in solution. Addition of acetic acid leads to disproportionation, which is evidenced by a reduction in the anodic current and a change in the open-circuit potential. The disproportionation process is slow enough for reduction of the oxoammonium to the nitroxyl to be observable on the CV timescale, with more rapid scan rates being less affected by disproportionation during the experiment.

In one example we used a glassy carbon electrode in 10 mM TEMPO in a) $CH_3CN$, and b) 9:1 $CH_3CN:CH_3CO_2H$, each with 0.1 M $LiPF_6$ supporting electrolyte.

In related examples, the electrolyte was 0.1 or 0.5 M $KPF_6$ dissolved in a) $CH_3CN$, b) 9:1 $CH_3CN:CF_3CO_2H$, or c) 9:1 $CH_3CN:CHCl_2CO_2H$. An electrolyte of 0.1 M LiN$(SO_2CF_3)_2$ was also briefly investigated and gave results similar to $LiPF_6$. The combination of $KPF_6$ with 9:1 $CH_3CN:CF_3CO_2H$ gave results similar to or superior to those described below and is also preferred on the basis of the lower cost of $KPF_6$ relative to lithium salts. A combination of $KPF_6$ and 9:1 $CH_3CN:CH_3CO_2H$ as the electrolyte and solvent was also tried and unexpectedly did not produce effective catalysis from the TEMPO/$NaNO_2$ mediator/catalyst system.

In another example, we used CV scans at 10 mV/s at a glassy carbon electrode in 10 mM TEMPO in 9:1 $CH_3CN$:$CH_3CO_2H$ with 0.1 M $LIPF_6$ supporting electrolyte plus 10 mM $NaNO_2$ under a) $N_2$, or b) $O_2$.

When $NaNO_2$ is added to a solution of acetic acid or halogenated acetic acids, $HNO_2$ and/or $NO_x$ is formed. Under these conditions, neither of these species can be reduced effectively at the electrode. An anodic feature at $E_p \approx 750$ mV may be due to the oxidation of dissolved NO.

Figure 8:
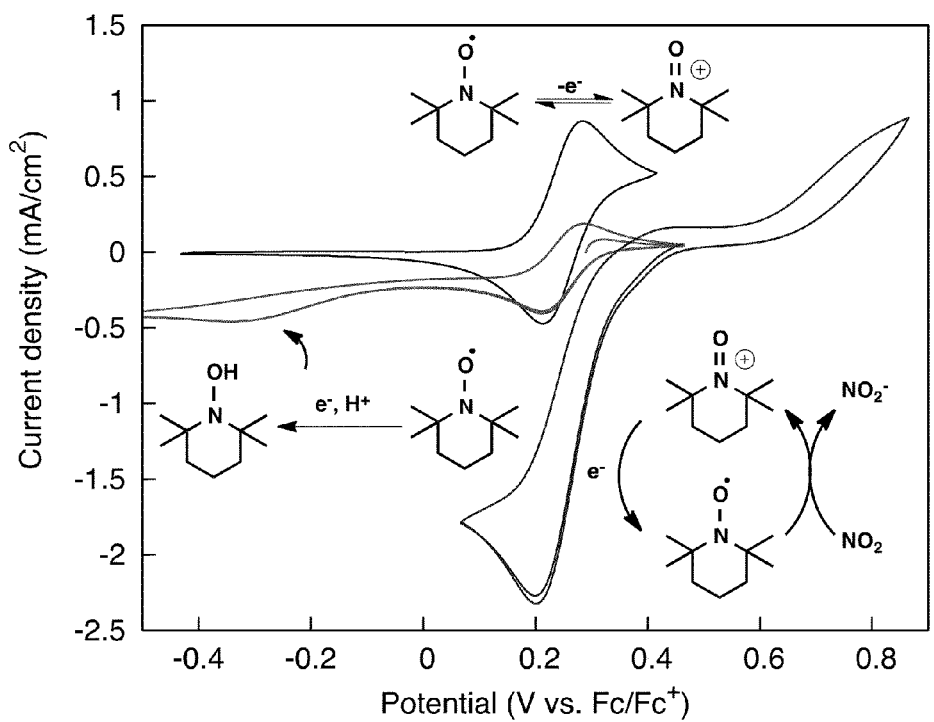
FIG. 8 depicts cyclic voltammograms obtained at 10 mV/s of 10 mM TEMPO in 9:1 $CH_3CN:CF_3CO_2H$.

However, whatever masked form of $NO_x$ is present in solution is capable of oxidizing TEMPO. This oxidation produces a further anodic shift in the open-circuit potential corresponding to complete oxidation of the TEMPO to its oxoammonium. Despite the addition of an excess of $NaNO_2$, the TEMPO redox feature remains symmetric and similar to CV of TEMPO in $CH_3CN$, suggesting that reoxidation of TEMPO by dissolved $NO_x$ is slow relative to the CV time scale. In experiments with trifluoroacetic acid in the place of acetic acid, the TEMPO redox feature becomes asymmetric on the addition of the acid, indicating that the acid induces disproportionation of TEMPO into its hydroxylamine and oxoammonium forms. Addition of excess $NaNO_2$ relative to TEMPO to this system induces complete oxidation of the TEMPO to its oxoammonium. Further, the TEMPO redox feature becomes asymmetric, indicating that TEMPO rapidly catalyzes the reduction of whatever form of $NO_x$ is produced in the presence of this acid (FIG. 8).

In another example we used CV scans at 100 mV/s at a glassy carbon electrode of a) 9:1 $CH_3CN:CH_3CO_2H$, b) the same solvent with 20 mM $NaNO_2$ added, and c) with 10 mM TEMPO and 20 mM $NaNO_2$, each with 0.1 M $LiPF_6$ supporting electrolyte. Again, the use of $KPF_6$ in 9:1 $CH_3CN:CF_3CO_2H$ gave improved results.

Substitution of TEMPO derivatives results in generally similar redox processes, albeit at shifted potentials. For example, installation of an acetamido group at the 4-position of TEMPO leads to a shift in $E_{1/2}$ of 105 mV. Because of its higher reduction potential, less disproportionation is observed on the addition of acetic acid. Otherwise, 4-acetamidoTEMPO displays voltammetric properties similar to TEMPO.

As a further proof of principle electrolysis experiments were performed in a glass cell with a frit dividing the working and counter electrode compartments. The working electrode consisted of a block of reticulated vitreous carbon (RVC), with carbon rods as the counter electrode and an $Ag/Ag^+$ reference electrode. After each experiment, the reference electrode was calibrated by CV of ferrocene (vide supra). The electrolyte solution consisted of 0.5 M $LiPF_6$ in 9:1 $CH_3CN:CH_3CO_2H$ or 0.5 M $KPF_6$ in 9:1 $CH_3CN$: $CF_3CO_2H$. Prior to electrolysis, the solution was purged with either nitrogen or oxygen. Experiments utilizing $NO_x$ were performed by adding $NaNO_2$ to the electrolysis cell and allowing the mixture to stir until dissolution was complete. $NaNO_3$ was also successfully used as a $NO_x$ source and displayed an induction period before catalysis began.

Constant-potential electrolysis of TEMPO in acid/acetonitrile mixed solvent can be performed under nitrogen at a potential where the oxoammonium produced by disproportionation is reduced. Addition of $NaNO_2$ at the end of the electrolysis regenerates the oxoammonium. In a subsequent electrolysis, an amount of charge is passed that is indicative of TEMPO-mediated reduction of $NO_x$. In contrast, $NaNO_2$ alone shows much less reduction current at a similar potential.

We also tried controlled-potential electrolyses in 9:1 $CH_3CN:CH_3CO_2H$ with 0.5 M $LiPF_6$ under $N_2$ of a) 10 mM $NaNO_2$ at 172 mV vs. ferrocene, b) 10 mM TEMPO, or c) 20 mM $NaNO_2$+10 mM TEMPO at 144 mV vs. ferrocene.

We also tried controlled-potential electrolyses in 9:1 $CH_3CN:CH_3CO_2H$ with 0.5 M LiPF6 under $O_2$ of 10 mM $NaNO_2$ with different nitroxyls, each at 10 mM.

Under oxygen-saturated conditions, neither $NO_x$ nor TEMPO alone show signs of catalytic oxygen reduction. Importantly, when added in combination, TEMPO and $NO_x$ produce sustained catalytic current in the presence of oxygen.

We also tried controlled-potential electrolyses in 9:1 $CH_3CN:CH_3CO_2H$ with 0.5 M $LiPF_6$ under $O_2$ of a) 10 mM $NaNO_2$ at 172 mV vs. ferrocene, b) 10 mM TEMPO at 155 mV vs. ferrocene, c) 20 mM $NaNO_2$+10 mM TEMPO at 144 mV vs. ferrocene, or d) no added catalyst or mediator at 158 mV vs. ferrocene.

We also tried a controlled-potential electrolysis of 10 mM TEMPO in 1 M aqueous $H_2SO_4$ at 618 mV vs. NHE using the heterogeneous $Pt/Al_2O_3$ catalyst described in Example 2. This system showed performance similar to the other mediators described in Example 2 once it reached steady state.

Changing from TEMPO to 4-acetamidoTEMPO allows the electrocatalytic $O_2$ reduction to proceed at ca. 100 mV higher potential. Substitution of ABNO for TEMPO allows a modest increase in potential despite ABNO's lower $E_{1/2}$, albeit at the cost of some current. In the 9:1 $CH_3CN$: $CF_3CO_2H$ solvent system, ABNO displays currents that are enhanced relative to those of TEMPO.

In sum, cyclic voltammetry of nitroxyls in solution showed that they undergo a reversible oxidation to the oxoammonium. Addition of acid leads to disproportionation of the nitroxyl to the oxoammonium and hydroxylamine or hydroxylammonium ion. Addition of nitrite caused complete oxidation to the oxoammonium. When the nitroxyl is oxidized, nitrite must be reduced, presumably to NO in a one-electron process. As demonstrated by bulk electrolysis experiments, the reduced $NO_x$ species is capable of aerobic oxidation to a substance capable of regenerating the oxoammonium.

By using a higher-potential nitroxyl, it is possible to raise the operating potential of the electrocatalytic process. The $E_{1/2}$ value for oxidation of 4-acetamidoTEMPO is 105 mV higher than that of TEMPO, and similar steady-state catalytic currents are observed when the potential is increased by that amount provided that the higher-potential nitroxyl is used. Presumably, this trend should hold so long as the oxidation potential of NO is high compared to that of the nitroxyl so that oxidation of the nitroxyl is not rate-limiting.

Bicyclic nitroxyls, such as ABNO (9-azabicyclo[3.3.1] nonane-N-oxyl), are less sterically congested than TEMPO or its analogues. As a result, ABNO should have more rapid reoxidation kinetics than TEMPO. If reoxidation involves conproportionation of an oxoammonium and a hydroxylammonium followed by oxidation of the product nitroxyls, this steric benefit should be even greater.

SUMMARY

In sum, regardless of whether the mediator is a quinone, or a nitroxyl, type compound, or other compound with similar attributes such as noted above, the invention will permit high efficiency without the need for high cost metallic cathodes.

While a number of embodiments of the present invention have been described above, the present invention is not limited to just these disclosed examples. There are other modifications that are meant to be within the scope of the invention and claims. Thus, the claims should be looked to in order to judge the full scope of the invention.

We claim:
1. A system comprising:
an electrode;
a liquid electrolyte solution in contact with the electrode, wherein the electrolyte solution comprises a redox mediator capable of transferring protons and electrons by acid/base and/or oxidation/reduction reactions, wherein the reduced form of the redox mediator is selected from the group consisting of an unsubstituted dihydroxybenzene, a substituted dihydroxybenzene, and a substituted hydroxylamine; and
a redox catalyst that is included in or in contact with the electrolyte solution, wherein the redox catalyst is not affixed to the electrode.

2. The system of claim 1, wherein the substituted or unsubstituted dihydroxybenzene is a 1,2-dihydroxybenzene (a catechol) or a 1,4-dihydroxybenzene (a hydroquinone).

3. The system of claim 1, wherein one or more hydrogen atoms in the substituted dihydroxybenzene is substituted with a substituent group that is independently selected from the group consisting of an alkyl with less than ten carbons, an aryl, a fused aryl, napthoquinone and derivatives thereof, anthraquinone and derivatives thereof, a heterocycle, an alkenyl, an alkynyl, a cycloalkyl, an amine, a protonated amine, a quaternary amine, sulfate, a sulfonate, sulfonic acid, phosphate, a phosphonate, a phosphinate, a ketone, an aldehyde, a hydrazone, an oxime, a nitrone, an ether, an ester, a halide, a nitrile, a carboxylate, an amide, a thioether, a fluoroalkyl, a perfluoroalkyl, a pentafluorosulfanyl, a sulfonamide, a sulfonic ester, an imide, a carbonate, a carbamate, an urea, a sulfonylurea, an azide, a sulfone, a sulfoxide, an amine oxide, phosphine oxide, a quaternary phosphonium, a quaternary borate, a siloxane, and a nitro.

4. The system of claim 1, wherein one or more hydrogen atoms in the substituted hydroxylamine is substituted with a substituent group that is independently selected from the group consisting of an alkyl with less than ten carbons, an aryl, a heterocycle, a cycloalkyl, and a bicycloalkyl.

5. The system of claim 4, wherein one or more of the substituent groups further comprises an alkyl with less than ten carbons, an aryl, a heterocycle, an alkenyl, an alkynyl, a cycloalkyl, an amine, a protonated amine, a quaternary amine, sulfate, a sulfonate, sulfonic acid, phosphate, a phosphonate, a phosphinate, a ketone, an aldehyde, an oxime, a hydrazone, a nitrone, an ether, an ester, a halide, a nitrile, carboxylate, an amide, a thioether, a fluoroalkyl, a perfluoroalkyl, a pentafluorosulfanyl, a sulfonamide, a sulfonic ester, an imide, carbonate, a carbamate, urea, a sulfonylurea, an azide, a sulfone, a sulfoxide, an amine oxide, a phosphine oxide, a quaternary phosphonium, a quaternary borate, a siloxane, a nitro, and combinations of two or more thereof on the same or on different positions on the substituent.

6. The system of claim 1, wherein the reduced form of the redox mediator is 1,4-dihydroxybenzene (hydroquinone).

7. The system of claim 6, wherein the redox catalyst comprises one or more metals selected from the group consisting of Pt, Pd, Bi, Te, W, Fe, Co, Mn, Mo, V, Ru, Cu and Ag.

8. The system of claim 7, wherein the redox catalyst is a cobalt organometallic complex.

9. The system of claim 1, wherein a form of the redox mediator is (2,2,6,6-tetramethylpiperidin-1-yl)oxy (TEMPO), 4-acetamidoTEMPO, or 9-azabicyclo[3.3.1] nonane N-oxyl (ABNO).

10. The system of claim 9, wherein the redox catalyst is a nitrogen oxide ($NO_x$).

11. The system of claim 1, wherein the redox catalyst comprises one or more metals selected from the group consisting of Pt, Pd, Bi, Te, W, Fe, Co, Mn, Mo, V, Ru, Cu and Ag.

12. The system of claim 11, wherein the redox catalyst comprises an organometallic complex.

13. The system of claim 12, wherein the organometallic complex is a metal macrocycle or metal chelate complex.

14. The system of claim 13, wherein the metal complex is M(salophen).

15. The system of claim 1, wherein the redox catalyst is a nitrogen oxide ($NO_x$).

16. The system of claim 1, wherein the electrolyte solution further comprises a pH buffer that is capable of accepting protons from and giving protons to the redox mediator.

17. The system of claim 1, wherein the electrolyte solution further comprises oxygen.

18. A cell comprising the system of claim 1 in ionic communication with an anodic half cell.

19. The cell of claim 18, wherein the cell is a fuel cell or an electro synthetic cell.

20. A method of producing electricity, comprising:
    contacting an anodic half cell with a fuel, wherein the anodic half cell is part of a cell that further comprises a system in ionic communication with the anodic half cell, wherein the system comprises (a) an electrode; (b) an electrolyte solution in contact with the electrode, wherein the electrolyte solution comprises a redox mediator capable of transferring protons and electrons by acid/base and/or oxidation/reduction reactions, wherein the reduced form of the redox mediator is selected from the group consisting of an unsubstituted dihydroxybenzene, a substituted dihydroxybenzene, and a substituted hydroxylamine; and (c) a redox catalyst that is included in or in contact with the electrolyte solution; and
    contacting the system with oxygen, whereby the fuel is oxidized, oxygen is reduced, and electricity is produced.

21. A method of producing a desired chemical product, comprising contacting an anodic half cell with a precursor of the desired chemical product, wherein the anodic half cell is part of a cell that further comprises a system in ionic communication with the anodic half cell, wherein the system comprises (a) an electrode; (b) an electrolyte solution in contact with the electrode, wherein the electrolyte solution comprises a redox mediator capable of transferring protons and electrons by acid/base and/or oxidation/reduction reactions, wherein the reduced form of the redox mediator is selected from the group consisting of an unsubstituted dihydroxybenzene, a substituted dihydroxybenzene, and a substituted hydroxylamine; and (c) a redox catalyst that is included in or in contact with the electrolyte solution, and
    contacting the system with oxygen, whereby the precursor is oxidized to the desired product, and the oxygen is reduced.

* * * * *